United States Patent
Gierling

(10) Patent No.: US 10,668,914 B2
(45) Date of Patent: Jun. 2, 2020

(54) METHOD FOR OPERATING A DRIVE TRAIN OF A MOTOR VEHICLE

(71) Applicant: ZF Friedrichshafen AG, Friedrichshafen (DE)

(72) Inventor: Michael Gierling, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/218,530

(22) Filed: Dec. 13, 2018

(65) Prior Publication Data

US 2019/0184962 A1 Jun. 20, 2019

(30) Foreign Application Priority Data

Dec. 15, 2017 (DE) .................. 10 2017 222 930

(51) Int. Cl.
*B60W 10/06* (2006.01)
*F02N 11/08* (2006.01)
(Continued)

(52) U.S. Cl.
CPC ............ *B60W 10/06* (2013.01); *B60W 10/08* (2013.01); *B60W 10/184* (2013.01);
(Continued)

(58) Field of Classification Search
CPC ........... B60W 30/18072; B60W 10/08; B60W 50/16; B60W 30/18109; B60W 50/029; B60W 10/184; B60W 10/10; B60W 30/143; B60W 50/14; B60W 10/06; B60W 2550/20; B60W 50/0205;
(Continued)

(56) References Cited

U.S. PATENT DOCUMENTS 6,754,579 B2   6/2004  Kamiya et al.
7,461,626 B2  12/2008  Kimes
(Continued)

FOREIGN PATENT DOCUMENTS

DE    199 31 161 A1    1/2001
DE    602 23 871 T2   10/2008
(Continued)

OTHER PUBLICATIONS

German Search Report Corresponding to 10 2017 222 928.4 dated Jul. 31, 2018.
(Continued)

*Primary Examiner* — Sizo B Vilakazi
(74) *Attorney, Agent, or Firm* — Davis & Bujold PLLC; Michael J. Bujold

(57) ABSTRACT

A method for operating a drive-train (1) of a motor vehicle having an internal combustion engine, a transmission connected between the internal combustion engine and a drive output, and a brake assembly. While the motor vehicle is traveling, if a manual command is given or if defined operating conditions exist, the drive-train (1) is operated in a coasting mode, in which the drive-train (1) is disengaged and the internal combustion engine is turned off. If the internal combustion engine, turned off for the coasting mode, fails to restart despite the existence of a signal to restart the internal combustion engine, a braking process is initiated automatically.

14 Claims, 1 Drawing Sheet

(51) Int. Cl.
*B60W 10/184* (2012.01)
*B60W 30/18* (2012.01)
*B60W 30/14* (2006.01)
*B60W 10/08* (2006.01)

(52) U.S. Cl.
CPC .... *B60W 30/143* (2013.01); *B60W 30/18072* (2013.01); *B60W 30/18109* (2013.01); *F02N 11/0818* (2013.01); *B60W 2710/182* (2013.01)

(58) Field of Classification Search
CPC ..... B60W 2550/404; B60W 2050/143; B60W 2050/146; B60W 2550/14; B60W 2250/402; B60W 2520/10; B60W 2550/408; B60W 2050/022; B60W 2710/182; Y02T 10/48; F02N 11/0814; F02N 11/0844; F02N 11/0818; F02N 11/0822; F02N 11/0825; F02N 11/0803; F02N 11/0833; F02N 11/0829
See application file for complete search history.

(56) References Cited

U.S. PATENT DOCUMENTS

| | | | |
|---|---|---|---|
| 8,834,321 | B2 | 9/2014 | Saito et al. |
| 8,958,970 | B2 | 2/2015 | Matsunaga et al. |
| 9,950,665 | B2 | 4/2018 | Hauler |
| 2002/0086772 | A1* | 7/2002 | Abe ........................ B60T 7/122 477/102 |
| 2003/0004635 | A1* | 1/2003 | Kamiya ................ B60W 10/06 701/112 |
| 2008/0162027 | A1 | 7/2008 | Murphy et al. |
| 2014/0039773 | A1* | 2/2014 | Bureau .................... B60T 7/122 701/70 |
| 2014/0324305 | A1* | 10/2014 | Larsson ................ B60W 10/02 701/54 |
| 2015/0166059 | A1 | 6/2015 | Ko |
| 2016/0230821 | A1* | 8/2016 | Morino ................... F16D 48/02 |
| 2017/0158204 | A1 | 6/2017 | Roos et al. |
| 2017/0341575 | A1* | 11/2017 | Hauler ..................... B60Q 1/30 |

FOREIGN PATENT DOCUMENTS

| | | |
|---|---|---|
| DE | 10 2007 062 439 A1 | 2/2009 |
| DE | 10 2011 002 095 A1 | 12/2012 |
| DE | 20 2013 012 645 U1 | 2/2015 |
| DE | 10 2014 208 758 A1 | 11/2015 |
| DE | 11 2010 005 563 B4 | 9/2016 |
| DE | 10 2016 209 203 A1 | 11/2017 |
| EP | 3 056 770 A1 | 8/2016 |
| WO | 2012/138263 A1 | 10/2012 |
| WO | 2016/007071 A1 | 1/2016 |

OTHER PUBLICATIONS

German Search Report Corresponding to 10 2017 222 929.2 dated Jul. 30, 2018.
German Search Report Corresponding to 10 2017 222 930.6 dated Jul. 31, 2018.

* cited by examiner

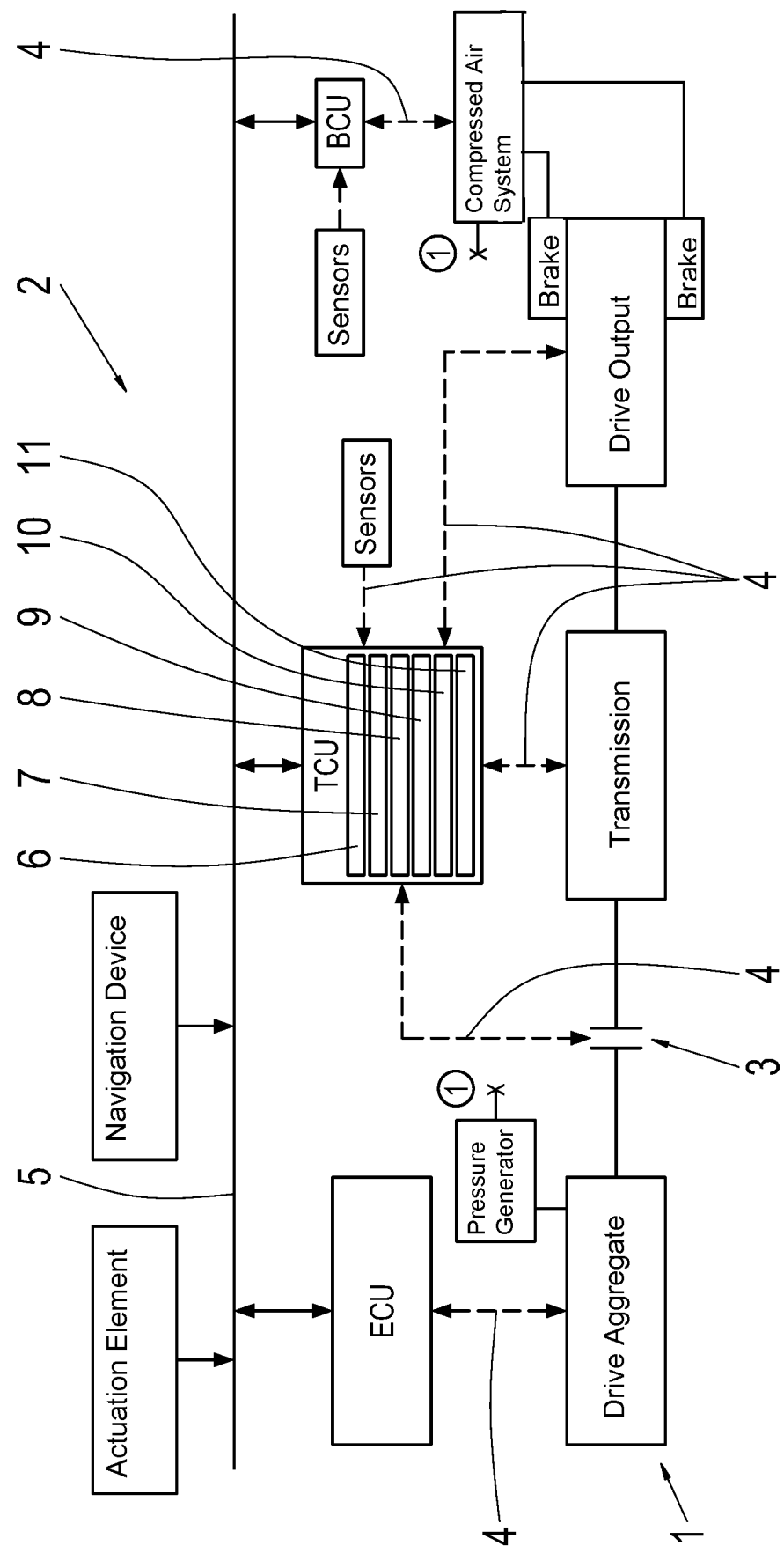

METHOD FOR OPERATING A DRIVE TRAIN OF A MOTOR VEHICLE

This application claims priority from German patent application serial no. 10 2017 222 930.6 filed Dec. 15, 2017.

FIELD OF THE INVENTION

The invention relates to a method for operating a drive-train of a motor vehicle. The invention also relates to a control unit for carrying out the method, and to a corresponding computer program product.

BACKGROUND OF THE INVENTION

In general, it is an aspiration of the development of new motor vehicles and the further development of existing motor vehicles, in particular commercial vehicles, to reduce fuel consumption and the emissions of harmful substances and $CO_2$. Besides the technical optimization of motor vehicles, such as the development of low-consumption and low-emission drive motors, efficiency-optimized multi-stage manual transmissions, tires with low rolling resistance, and streamlined vehicle bodies, truck drivers' cabins and truck bodies, a further possibility for reducing fuel consumption and the emissions of harmful substances and $CO_2$ is to use the motor vehicle with appropriate control of the driving operation.

To save energy and costs and to reduce the burden on the environment, in suitable driving situations vehicles can temporarily continue moving ahead without drive-power, in so-termed rolling or coasting mode. In particular, in a motor vehicle in the rolling mode the internal combustion engine can be operated with as low fuel consumption and emissions as possible by idling, while the vehicle is rolling with its drive-train disengaged. If the internal combustion engine is switched off in such a driving situation in order to increase the saving effect still more, the vehicle moves in a so-termed coasting mode. These functions are already known.

Depending on the drive-train components present and the existing type of transmission, the power flow can be interrupted by shifting the transmission to neutral or by opening a starting clutch, as soon as a rolling mode or coasting mode is deemed possible.

WO 2016/007071 A1 describes a method for controlling an internal combustion engine of a motor vehicle. With regard to a future speed profile, it is established by simulation whether the motor vehicle can be operated in a coasting mode. Before the motor vehicle is operated in the coasting mode, various conditions are checked, which must be satisfied in order to authorize the internal combustion engine to be switched off.

SUMMARY OF THE INVENTION

The purpose of the present invention is to provide a new type of method for operating a drive-train of a motor vehicle. In addition a control unit designed to carry out the method and a computer program product for carrying out the method are to be indicated.

From the process-technological standpoint this objective is achieved, starting from the characterizing features of the independent claims. A control unit for operating a drive-train of a motor vehicle is also the object of the independent claims. As for a computer program product, reference is also made to the independent claims. Advantageous further developments are the object of the subordinate claims and of the description that follows.

A method for operating a drive-train of a motor vehicle is proposed, wherein the drive-train comprises an internal combustion engine, a drive output, a transmission connected between the internal combustion engine and the drive output, and a brake assembly.

The motor vehicle can be a passenger car or a commercial vehicle such as a truck or a bus.

In this case the transmission is in particular a multi-gear transmission in which a plurality of transmission ratio steps, i.e. fixed gear ratios between two shafts of the transmission, can be engaged by shifting elements, preferably in an automated manner. The shifting elements can be interlocking or frictional shifting elements. Such transmissions are used in motor vehicles in order to suitably adapt the rotational speed and torque output characteristic of the drive unit to the driving resistances of the vehicle. By appropriate control of the shifting elements the transmission can be brought to a neutral position, in which the internal combustion engine is disconnected from the drive output.

It is provided that during the driving of the vehicle, if a manual command is issued or if defined operating conditions exist the drive-train is operated in a coasting mode in which the drive-train is disengaged and, to produce the coasting mode, the internal combustion engine is switched off.

The manual command for the coasting mode can for example be made by a vehicle driver by manually actuating an appropriate operating element. The operating element can for example be in the form of a key or switch arranged on the instrument panel of the motor vehicle.

Before the motor vehicle is operated automatically in the coasting mode various operating conditions are checked, which have to be satisfied in order to authorize opening the drive-train and switching off the internal combustion engine. For example, the operating conditions that must be satisfied for coasting operation include a current travel speed higher than a defined minimum speed, the absence of an acceleration demand, the absence of a deceleration demand, and if necessary also a current road gradient between a permissible maximum downhill inclination and a permissible maximum uphill slope.

For example, there is no acceleration demand if an accelerator pedal is not actuated or there is no engine torque demand from an active cruise control, whereas for example there is no deceleration demand if a brake pedal is not actuated or there is no braking torque demand from an active cruise control.

As a further operating condition for the initiation of the coasting mode, while driving with the drive-train closed a speed variation forecast for a road section ahead when the power flow in the drive-train is interrupted, is determined. For this, in a manner known as such, a road gradient variation or a driving resistance profile for the road section ahead can be determined from elevation data taken from a topographical map. From the road gradient variation or driving resistance profile, and taking into account the current travel speed, the mass of the vehicle, the rolling resistance and the air resistance of the vehicle the speed variation when the power flow is interrupted can be determined and, depending on the speed variation determined, the coasting mode can be authorized or blocked. The topographical map can be stored, for example, in a transmission control unit of the transmission or in a navigation unit of the motor vehicle.

The invention is now based on the technical principle that if the internal combustion engine, having been switched off for the coasting mode, fails to restart despite the presence of a signal to start the internal combustion engine, a braking process is automatically initiated in order to brake the motor vehicle.

In other words, when the drive-train is being operated in a coasting mode and a signal to restart the internal combustion engine is given but the internal combustion engine cannot be started, a braking process is triggered in order to brake the motor vehicle. In that the motor vehicle is automatically braked if the internal combustion engine is not restarted despite the presence of a signal to restart the internal combustion engine, the operating safety of the motor vehicle can be increased. The automatically triggered braking process can be controlled in such manner that the motor vehicle is braked until it comes to rest.

A signal to start the internal combustion engine and therefore to terminate the coasting mode can be produced for example due to an engine torque demand, for example by actuation of an accelerator pedal, or due to a deceleration demand such as the actuation of a brake pedal.

To carry out the braking process, the brake assembly of the motor vehicle is preferably actuated. The brake assembly preferably comprises the service brakes of the motor vehicle, which can for example be in the form of wheel brakes.

Passenger cars as a rule have a hydraulic brake assembly, with which a braking torque can be produced in hydraulically controlled wheel brakes for braking the wheels of the vehicle. In such cases the braking pressure is for example built up by means of brake cylinders connected to the wheel brakes.

In contrast, commercial vehicles as a rule have a pneumatic brake assembly with which a braking torque for braking the vehicle can be produced by pneumatically controlled wheel brakes. In this case too the braking pressure can be built up by brake cylinders connected to the wheel brakes.

To carry out the automatically initiated braking process it can for example be provided that the brake cylinders of the wheel brakes are acted upon by a predefined pressure, in order to produce the desired braking torque for braking the vehicle wheels. It can also be provided that by virtue of the braking pressure produced in the brake cylinders of the wheel brakes a predefined braking gradient is maintained as a set magnitude for the braking process.

The predefined braking gradient can in this case be fixed, or it can be specified as a function of a current speed, an expected topography of a road section ahead, or a current traffic situation determined, at the moment when the braking process is triggered.

In an advantageous further development it is provided that a driver of the motor vehicle in which the automatically triggered braking process is carried out, is informed about the automatically triggered braking process. Thus, a warning message can be generated by means of which the driver of the vehicle is informed about the automatically triggered braking process. The warning message can for example be in the form of an acoustic, visual and/or haptic signal.

A warning message can also be produced, by means of which other road users in the vicinity of the motor vehicle are informed about the automatically triggered braking process of the motor vehicle. Thus, the automatically triggered braking process of the motor vehicle can for example be indicated to the other road users by automatic actuation of the warning blinkers of the motor vehicle. If the motor vehicle in which the automatic braking process is carried out and the road users in the vicinity of the motor vehicle, for example passenger cars or commercial vehicles, have so-termed Car2Car interfaces, then the road users in the vicinity of the motor vehicle can be informed about the automatic braking process by means of a Car2Car communication. The Car2Car communication can for example take place by means of a WLAN-based communication technique.

If the internal combustion engine cannot be started even after the automatically triggered braking process has been carried out, then the motor vehicle is no longer in a condition to be driven. In that case a notification about the breakdown of the motor vehicle can automatically be transmitted to a remote device. By means of the remote device, for example a vehicle carrier, or the owner of the vehicle, or a workshop or a tow-truck can be informed about the breakdown of the motor vehicle.

In an advantageous further development, with reference to existing information from stored map data or with reference to detected environmental data, road section zones can be recognized in which stopping of the vehicle should be avoided. The automatically triggered braking process of the motor vehicle is controlled in such manner that the motor vehicle does not stop in those road section zones. The road section zones can for example be railroad crossings, crossroads, etc. Thus, the braking process for braking the motor vehicle can be carried out in the form of a full brake application if a railroad crossing has been recognized ahead of the motor vehicle, which cannot be crossed over with certainty if the motor vehicle is unable to accelerate. In that way a breakdown of the motor vehicle on the railroad crossing can be avoided, and consequently this increases traffic safety.

The braking process can also for example be controlled in such manner that a preferred parking position determined with reference to existing information from stored map data or with reference to detected environmental data is reached. Thus, for example, the motor vehicle can be braked in such manner that the motor vehicle is stopped in a nearby parking space or in an emergency stop lane close to the motor vehicle.

To receive the environmental data the motor vehicle has a sensor device which can include a plurality of sensors, for example a video sensor, a radar sensor, a lidar sensor, etc. The sensors are positioned at appropriate points on the motor vehicle.

A further development of the invention provides that to assist the automatic braking process, the drive-train is closed and, in the transmission, a gear that supports the braking process is engaged. If for the purposes of the coasting mode the drive-train has been disengaged by opening the starting clutch, then in order to assist the automatic braking process the clutch is closed. Consequently the motor vehicle is operated in an overdrive mode in which the drag torque of the internal combustion engine can be used to assist the braking process. To assist the braking process, the starting clutch can also be operated with slip, and then the drag torque of the internal combustion engine is reduced.

Furthermore, to assist the braking process a wear-free permanent brake present in particular in commercial vehicles, for example in the form of an engine brake or a retarder, can also be actuated. This can achieve selectively controlled braking of the motor vehicle.

The invention also relates to a control unit designed to carry out the method according to the invention. The control unit comprises means that serve to implement the method according to the invention. These means include hardware means and software means. The hardware means of the control unit are interfaces for exchanging data with the assemblies of the drive-train that participate in carrying out the method according to the invention. For this, the control unit is also connected to necessary sensors and if needs be also to other control units in order to pick up the decision-relevant data and to issue control commands. For example the control unit can be in the form of a transmission control unit or a brake control unit. The hardware means of the control unit also include a processor for data processing and if appropriate, a memory for data storage. The software means consist of program modules for carrying out the method according to the invention.

The system according to the invention can also be embodied as a computer program product which, when it is running on a processor of a control unit, instructs the processor software to carry out the associated process steps which are the object of the invention. In this connection the object of the invention also includes a computer-readable medium on which the aforesaid computer program product can be stored and recalled.

The invention is not limited to the combination of features indicated in the independent claims or the claims that depend on them. There are in addition possibilities for combining individual features with one another, provided that they emerge from the claims, the description given below, or directly from the FIGURE.

BRIEF DESCRIPTION OF THE DRAWINGS

Preferred further developments emerge from the subordinate claims and the following description. An example embodiment of the invention, to which it is not limited is explained in greater detail with reference to the FIGURE. The sole FIGURE shows a schematic representation of a drivetrain with a control unit for carrying out the method according to the invention.

DETAILED DESCRIPTION OF THE PREFERRED EMBODIMENTS

FIG. 1 shows a schematic representation of a drive-train 1 of a motor vehicle which is a commercial vehicle such as a truck or a bus. This drive-train 1 comprises a drive aggregate that can be coupled on its drive output side to the drive input side of a transmission by way of an interposed starting clutch 3. On its drive output side, the transmission is then connected to other drive output components long known to those familiar with the subject, and to the vehicle wheels of the commercial vehicle.

The drive aggregate of the motor vehicle can be in the form of an internal combustion engine. Besides an internal combustion engine, however, the drive aggregate can also comprise an electric machine and consequently be in the form of a hybrid drive.

The transmission is preferably an automatic or automated transmission in which, to engage gear steps, frictional and/or interlocking shifting elements are closed.

The drive-train 1 can be disengaged either by opening the starting clutch 3 or by shifting the transmission to neutral. When the drive-train is disengaged the internal combustion engine is disconnected from the drive output.

In this case the drive-train 1 has a pneumatic brake assembly with which a braking torque can be produced in pneumatically controlled wheel brakes for braking the vehicle wheels. The braking pressure can be built up by means of brake cylinders connected to the wheel brakes. For this, the drive-train 1 is equipped with a compressed-air system, of which here only a small part is illustrated schematically. The compressed air system comprises a pressure-generator that produces compressed air or pressurized air and makes it available to the compressed air system. In this case the pressure-generator expediently works as a compressor and can be in permanent drive connection with the drive aggregate. The compressed air system also comprises at least one compressed-air reservoir, in which compressed air or pressurized air can be intermediately stored.

In addition the motor vehicle comprises a control system 2 in which a plurality of different control units are connected to one another by way of a data bus system 5, for example a CAN bus system. Among others, in the data bus system 5 an engine control unit ECU, a transmission control unit TCU and a brake control unit BCU are provided, of which the engine control unit ECU is responsible for controlling the drive aggregate, the transmission control unit TCU for controlling the transmission and—in some circumstances indirectly via a further control unit—also the starting clutch 3, and the brake control unit BCU for controlling the pneumatic brake unit. The transmission control unit TCU can communicate bidirectionally on the one hand with the transmission and on the other hand with the engine control unit ECU and the brake control unit BCU. By way of the data bus system 5, the control units are provided with the data relevant for them. The control units can receive signals from the sensors, process those signals, and as a function of them emit control or data signals.

Thus, for example, the transmission control unit TCU comprises a processor 6 and storage means 7 for the storage and recall of parameters, signals and information, as well as a computer program product 11 designed in such manner that if engine starting problems occur, it can automatically initiate a braking process for braking the motor vehicle. In addition the transmission control unit TCU comprises at least one receiving interface 8 designed to receive all the relevant data from the sensors provided. The transmission control unit TCU also comprises a data processing device 9 for processing and evaluating the data received or the information in the data received, and a transmitting interface 10 by way of which corresponding signals can be emitted for the control of drive-train components.

The transmission control unit TCU controls the operation of the transmission with reference to driving condition data and data reflecting the wishes of the driver. A shifting strategy stored in the transmission control unit TCU in the form of a computer program determines respective shifting reactions, in particular a gearshift from a current actual gear to a target gear, or a temporary power flow interruption in the drive-train 1.

Besides the road condition determined, the driving condition data used can include the current driving resistance, the current vehicle inclination, the current vehicle mass, the current vehicle speed, the current vehicle acceleration, the current engine torque, the current engine rotational speed and other values. These data can at least in part be supplied by the engine control unit ECU and by suitable sensor devices.

Driver's wish data can for example be signaled by the actuation of an actuation element, or detected by sensors, and sent directly or indirectly to the transmission control unit TCU. The actuation element can for example be in the form of an accelerator pedal or a switch for the manual initiation of the coasting mode.

Data from a navigation device are supplied to the control unit 2. The navigation device provides topographical data about the surroundings of a current position of the motor vehicle and about the surroundings at a defined distance ahead of the current position of the motor vehicle. The location of the current vehicle position can be determined by means of a satellite positioning system such as GPS or GLONASS.

The control units are connected for data exchange with data-transmitting connections 4 to corresponding components of the drive-train 1. The data-transmitting connections 4 between the control units and the drive-train components can for example be in the form of one or more electronic bus systems.

If while the drive-train 1 is being operated in a coasting mode the conditions necessary for the coasting mode are no longer satisfied, then the coasting mode must be terminated by starting the internal combustion engine. For this, for example the transmission control unit TCU can send a corresponding signal to the engine control unit ECU, which then authorizes the starting of the internal combustion engine. But if the engine cannot be started, despite the presence of the signal for starting the internal combustion engine, then the method according to the invention provides that a braking process for braking the motor vehicle is triggered automatically.

For this, the transmission control unit TCU can emit a signal to the brake control unit BCU to initiate the braking process. Then, as a function of the environmental conditions detected. the braking process is authorized by the brake control unit BCU in that the brake cylinders of the wheel brakes of the motor vehicle are acted upon by a predefined braking pressure or one that is appropriate for the operating situation of the motor vehicle.

INDEXES

1 Drive-train
2 Control system
3 Starting clutch
4 Connection
5 Data bus system
6 Processor
7 Storage means
8 Receiving interface
9 Data processing device
10 Transmitting interface
11 Computer program product
ECU Engine control unit
TCU Transmission control unit
BCU Brake control unit

The invention claimed is:

1. A method for operating a drive-train of a motor vehicle having an internal combustion engine, a transmission connected between the internal combustion engine and a drive output, and a brake assembly, the method comprising:
while the motor vehicle is traveling and if either a manual command is issued or defined operating conditions exist, operating the drive-train in a coasting mode in which the drive-train is disengaged and the internal combustion engine is turned off;
issuing a signal to restart the internal combustion engine;
monitoring whether the internal combustion engine has restarted or has failed to restart after the signal to restart the internal combustion engine has been issued;
automatically initiating a braking process for braking the motor vehicle when the internal combustion engine has failed to restart after the signal to restart the internal combusting engine has been issued;
specifying a predefined braking gradient based on one of a current speed, an expected topography of a road section ahead, and current traffic situation determined, when the braking process is initiated; and
applying a predefined pressure on wheel brakes or braking wheels of the motor vehicle and maintaining the predefined braking gradient.

2. The method according to claim 1, further comprising carrying out the braking process in such a manner that by virtue of a braking pressure called for, either the predefined braking gradient is maintained as a set magnitude or a predefined pressure is set in the brake assembly.

3. The method according to claim 2, further comprising specifying the predefined braking gradient as either fixed or dependent upon one of:
the current speed at the time when the braking process is triggered,
the expected topography of the road section ahead, and
the determined current traffic situation; and
assisting the automatic braking process by engaging the drive-train and engaging a gear in the transmission that supports the braking process.

4. The method according to claim 1, further comprising alerting a driver of the vehicle, by at least one of an acoustic signal, a visual signal and a haptic signal, to the automatically initiated braking process.

5. The method according to claim 1, further comprising informing other road users, in a vicinity of the motor vehicle, about the automatically initiated braking process of the motor vehicle.

6. The method according to claim 5, further comprising transmitting information about the automatically initiated braking process of the motor vehicle to the other road users in a vicinity of the motor vehicle by means of a Car2Car communication.

7. The method according to claim 1, further comprising, if the internal combustion engine can still not be started even after the automatically initiated braking process has been carried out, transmitting a signal indicating a breakdown of the motor vehicle to a remote device.

8. The method according to claim 1, further comprising identifying route sections in which a vehicle standstill is to be avoided based on either available information from stored topographical map data or detected environmental data about surroundings of a current position of the motor vehicle and a position at a defined distance ahead of the current position of the motor vehicle, and
controlling the automatically initiated braking process of the motor vehicle to avoid stopping the motor vehicle along identified route sections.

9. The method according, to claim 1, further comprising controlling the automatically initiated braking process in such a manner that a stopping position preferred on a basis of either existing information from stored map topographical data or detected environmental data about surroundings of the motor vehicle is reached.

10. The method according to claim 1, further comprising engaging the drive-train and engaging a gear in the transmission that supports the braking process to assist the automatically initiated braking process.

11. The method according to claim 1, further comprising actuating a permanent brake of the drive-train to assist the automatically initiated braking process.

12. A control unit for operating a drive-train of a motor vehicle for carrying out the method according to claim 1.

13. A computer program product with program code means stored on a computer-readable data carrier for carrying out the method according to claim 1 when the computer program product is either run on a computer or on a computer unit of a control unit of the drive train.

14. A method for operating a drive-train of a motor vehicle having an internal combustion engine, a transmission that is connected between the internal combustion engine and a drive output, a brake assembly, and at least one control unit, the method comprising:
- operating, via the at least one control device, the vehicle in a coasting mode, when either a manual command has issued or a defined operating condition exists, in which the motor vehicle is traveling, the internal combustion engine is turned off and the drive-train is disengaged;
- issuing a signal, with the at least one control device, for restarting the internal combustion engine;
- recognizing, with the at least one control device, a failure of the internal combustion engine to restart;
- automatically initiating a braking process with the at least one control device for braking the motor vehicle;
- specifying a predefined braking gradient based on one of a current speed, an expected topography of a road section ahead and a current traffic situation determined, when the braking process is initiated; and
- acting upon wheel brakes of the brake assembly with a predefined pressure to: control the braking process so as to maintain the predefined braking gradient.

* * * * *